(No Model.)
J. McGOWAN.
PLANT PROTECTOR.
No. 583,925.  Patented June 8, 1897.
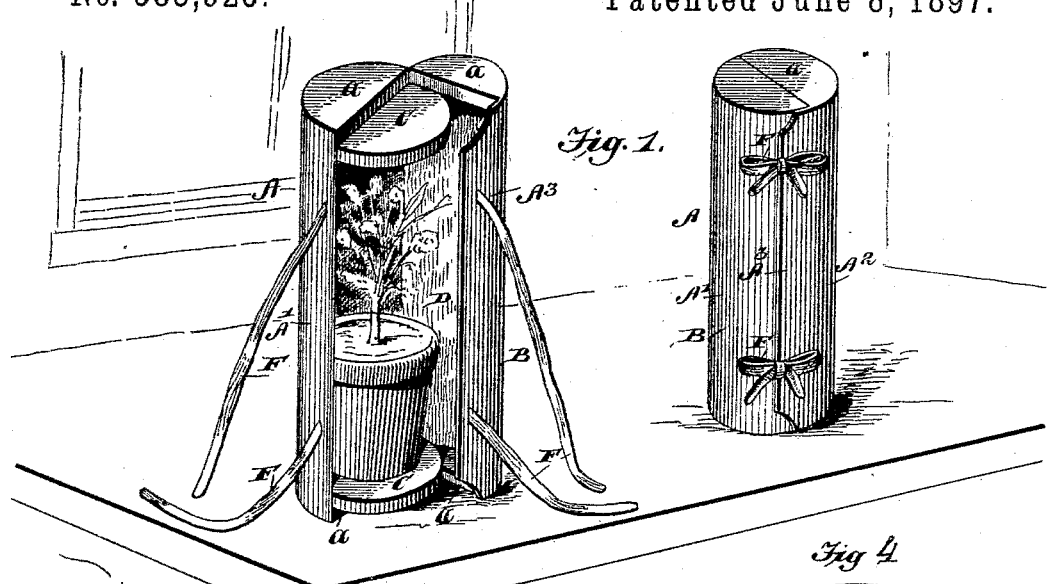
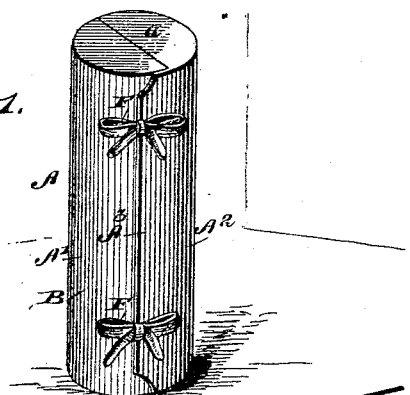
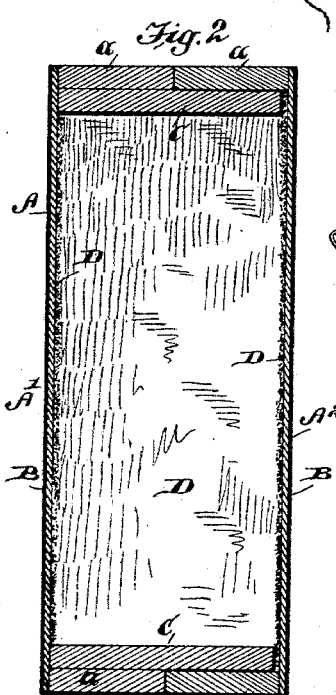
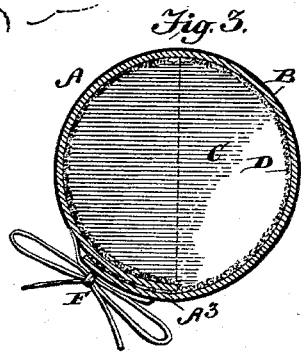
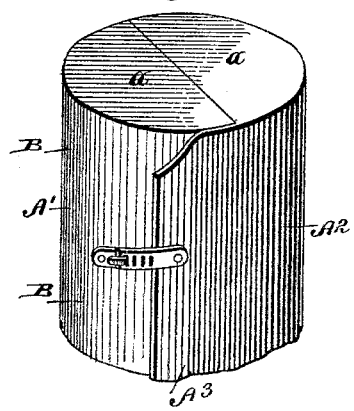
WITNESSES:
INVENTOR
John McGowan
BY O'Meara & Co
ATTORNEY.

UNITED STATES PATENT OFFICE.

JOHN McGOWAN, OF ORANGE, NEW JERSEY.

PLANT-PROTECTOR.

SPECIFICATION forming part of Letters Patent No. 583,925, dated June 8, 1897.

Application filed March 20, 1896. Serial No. 584,194. (No model.)

*To all whom it may concern:*

Be it known that I, JOHN McGOWAN, residing at Orange, in the county of Essex and State of New Jersey, have invented a new and Improved Plant-Protector, of which the following is a specification.

This invention is an improved plant and flower protector and carrier for florists' use.

Heretofore when a florist desired to send or carry plants or flowers from one place to another, as in case of a wedding, banquet, &c., it has been necessary in cold weather to wrap each plant securely in paper, cotton, or other covering in order to protect said plant against frost. This consumes a great deal of time and labor, and, furthermore, is not always safe.

The object of my invention, therefore, is to avoid all these objections and provide an improved protecting-carrier in which the plant can be quickly and easily packed, thus saving a great deal of time and labor, and also provide a holder or carrier which will be absolutely safe in all conditions of weather and against heat as well as cold.

Another object is to provide a protecting holder or carrier which is always ready for use; and a still further object is to provide a carrier which is adapted for carrying a single plant or a number of such plants at one and the same time, said holders or carriers being made any size and shape desired.

In view of the above-mentioned objects my invention consists, essentially, in making the holder or carrier of two similar sections hinged together and adapted to fold together to form a box or case, said sections being lined inside with raw cotton. Felt, wool, or other non-conducting substance could be used.

The invention consists also in covering the box or case before described with a suitable waterproof covering; and it also consists in providing suitable heads upon the ends of the sections to render said ends perfectly tight.

The invention consists also in certain details of construction and combination, all of which will be fully described hereinafter, and pointed out in the claim.

In the drawings forming a part of this specification, Figure 1 is a view showing two of my holders or carriers, one of which is opened to expose the plant therein, the other being closed and tied. Fig. 2 is a vertical longitudinal section. Fig. 3 is a transverse section. Fig. 4 shows a modification.

In the practical embodiment of my invention I employ a box or case A, which is preferably composed of two similar sections $A'$ $A^2$, each section being preferably semicylindrical in shape, as clearly shown in Fig. 1. The box or case is made of heavy pasteboard, papier-mâché, leather, or other suitable material, the semicircular ends $a$ of the sections, however, being composed of wood for the sake of strength and to provide a suitable base for the attachment of the sides of the case. The sections are hinged together in any suitable manner, and the exterior of the outer box or case is covered with a waterproof covering B, of linen or other suitable material.

The section $A^2$ is formed with a flap $A^3$ at its free end, which overlaps the meeting edges of the sections $A'$ $A^2$, thus protecting the longitudinal joint of the sections, and in order to cover the joints between the semicircular ends $a$ I provide circular head-pieces C C upon the interior of the ends $a$ $a$ of the section $A'$, said heads being adapted to fit into the section $A^2$ when the sections are closed. While I prefer to arrange these heads upon the interior of the box or case, it is obvious that said heads could be arranged upon the exterior, but when arranged upon the interior afford a suitable base to rest the flower-pot upon.

The interior of the box or case has a lining D, of raw cotton, felt, wool, or other suitable material, to keep the plant warm, said lining extending around the interior sides of the sections and likewise the flap, the material on the flap serving as a packing to keep out the cold, and as the lining extends to the ends in the section $A^2$ the heads C on section $A'$ will fit tightly against and form a tight joint at this point. Strings F F are attached to the sections, by means of which the sections can be securely united, and in place of ordinary strings the sections can be provided with buckles or other forms of fastening devices.

The cylindrical-shaped box or case can be used for carrying potted plants or cut flowers, as desired, and when carrying potted plants it will of course be understood that the pot rests upon one of the flat circular heads C.

When it is desired to carry a plant or a lot of flowers, said plant or flowers are simply placed within the box or case, and said box or case is closed and tied, and as the case is thoroughly lined with cotton or wool and covered with linen it is clear that the frost cannot reach the plants or flowers. Furthermore, the circular heads and overlapping flap prevent any possible entrance of cold air at the joints of the box or case.

By means of my device I do away with wrapping or packing the plants, and thereby save a great deal of time and labor, and, again, I have found the improved holder or carrier far safer than any packing or wrapping ordinarily employed by florists.

Having thus described my invention, what I claim as new, and desire to secure by Letters Patent, is—

As an improved article of manufacture, a plant or flower holder or carrier, composed of the sections $A'$, $A^2$, essentially cylindrical in shape, the semicircular ends, $a$, said sections being hinged together and covered with a waterproof covering B, the flap $A^3$, attached to the sections $A^2$, the circular head-pieces C, arranged upon the interior of the ends $a$, of the section $A'$, said heads being adapted to fit into the section A, when said sections are closed, an interior lining D, of raw cotton or similar material, and the strings F, attached to the sections and by means of which the said sections can be secured, all arranged and adapted to operate, substantially as shown and described.

JOHN McGOWAN.

Witnesses:
JOHN J. CUDDY,
L. SHOENTHAL.